G. L. McINTOSH.
MECHANISM FOR SEPARATING GAS FROM LIQUIDS.
APPLICATION FILED JUNE 20, 1912.
1,055,549.
Patented Mar. 11, 1913.
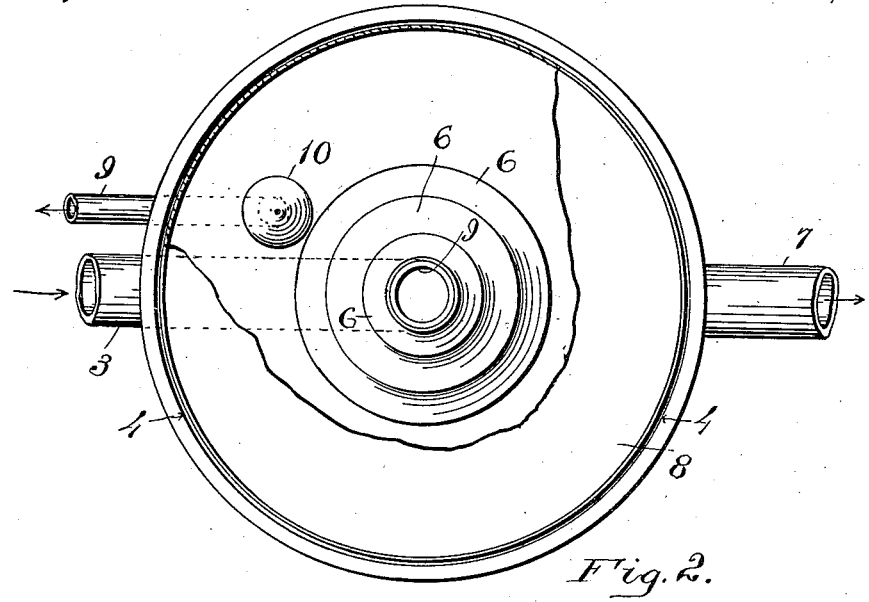
Fig. 2.
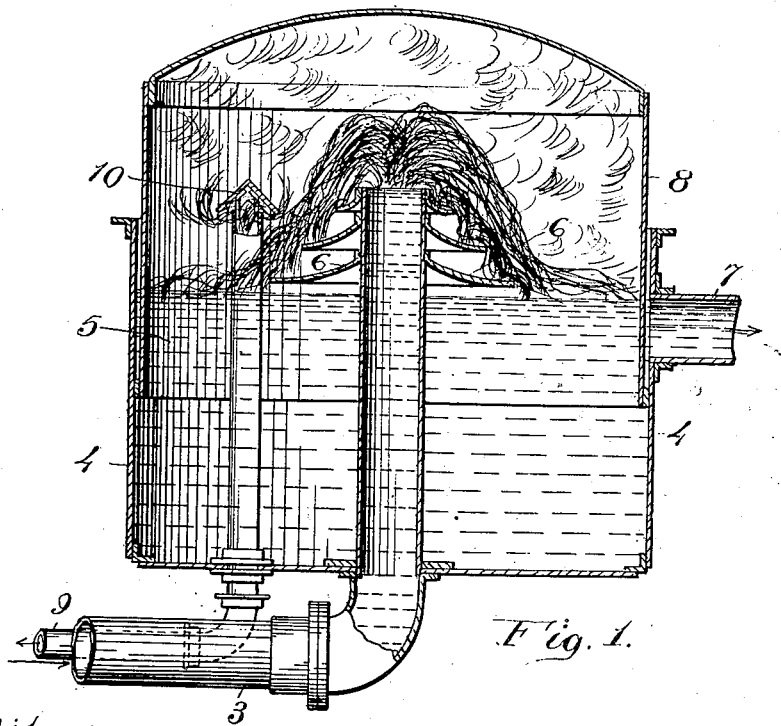
Fig. 1.
Witnesses:
Inventor:
G. L. McIntosh
By 
Atty

UNITED STATES PATENT OFFICE.

GEORGE L. McINTOSH, OF LOS ANGELES, CALIFORNIA, ASSIGNOR OF TWO-THIRDS TO KATHRYN L. BYRNE AND ROSCOE C. OLMSTED, BOTH OF PASADENA, CALIFORNIA.

MECHANISM FOR SEPARATING GAS FROM LIQUIDS.

1,055,549.  Specification of Letters Patent.  Patented Mar. 11, 1913.

Application filed June 20, 1912. Serial No. 704,770.

*To all whom it may concern:*

Be it known that I, GEORGE L. MCINTOSH, a citizen of the United States, and resident of Los Angeles, in the county of Los Angeles and State of California, have invented certain new and useful Improvements in Mechanism for Separating Gas from Liquids, of which the following is a specification.

My invention relates to improvements in mechanism or apparatus for separating gas from liquids, and it consists of a separating device to be used in connection with pumping mechanism.

The object of the invention herein is to separate gas from liquids, and to collect the gas into a holder and retain it for use for heating and lighting purposes, as well as to constitute a store of said gas to be utilized for driving gas engines, or for use in other apparatuses where gas is employed.

In my present invention I lead the main discharge pipe from a pump into a tank of sufficient capacity to hold any required quantity of water or other liquid, such, for instance, as petroleum, and also to contain a collecting chamber or receiver, as a gas holder. The receiver has a discharge pipe for the liquid, and another pipe extends up into the gas holder, from which the gas collected therein passes through into the heating or lighting apparatus, or into the cylinder or cylinders of gas engines wherein it is used.

The upper part of the gas discharge pipe is provided with two or more flanges of thin metal, or other material, each inclined downwardly, so that the liquid as it issues from the discharge pipe passes over the upper end of the discharge pipe, and flows down over these inclined flanges of metal, dropping at the circumference of each such flange on to the next succeeding flange below. In this manner, the liquid flows in thin layers out from the discharge pipe over the succession of flanges, so that it is spread over a series of thin and extended layers whereby the gas contained therein in the liquid is freed and collected in the gas chamber.

For the purposes of facilitating the action of the pump, as well as for preventing as much as possible of the gas, ascending with the liquid into the lift-pipe, from passing into the pump, I connect a large discharge pipe for the gas, coupled at its upper end to a vacuum pump. The object in this case being to provide as large an area of discharge of the gas as is possible to the vacuum pump, and the discharge from the vacuum pump is connected to the gas pipe, whereby the gas, separated from the liquid passing into the gas holder, is led from the gas holder for lighting and heating purposes, or for driving motive power engines, as will now be set forth in detail.

In the drawings, Figure 1 is a vertical section of the tank and gas holder, for separating gas from liquids. Fig. 2 is a plan, partly in section, of Fig. 1.

In the drawing 3 is the discharge pipe from the pump, which is led through the bottom of a tank 4, and to a sufficient height above the level of the liquid 5, contained therein, to enable the liquid to discharge and trickle down over the inclined flanges 6, which surround the upper end of the pipe. I have shown but three flanges, but a lesser or a greater number of such flanges may be used.

The tank 4 is provided with an overflow pipe 7 for the discharge of the liquid. Within the tank 4 is an inverted gas bell or holder 8, which is air or gas tight, the lower part of which dips to a sufficient depth into the liquid in the tank 4 to prevent leakage or outflow of gas from the bell or gas holder 8, excepting through the gas pipe 9, through which pipe the gas flows to a reservoir or chamber wherein it may be stored for lighting or heating purposes, or to a carbureter for being commingled with air for operating in the cylinders of explosive engines, or for other purposes.

The head of the gas pipe 9, within the gas holder 8, is preferably provided with a hood or shield 10.

It will be understood from the foregoing description that this invention is a separating device, located in the discharge pipe of a pump, which is lifting either water or any other liquid that contains a gas, so that the gas, separated from the liquid, may be used for any purpose for which it is adapted.

I claim:

1. In a mechanism for separating gas from liquids, a tank, a stand pipe in said tank through which liquid is forced into the tank, the stand pipe having below its upper end and supported thereon a plurality of flanges upon or over which the liquid trickles as it is discharged from the stand pipe, an overflow pipe, a bell or gas holder located within the tank, a pipe for allowing the escape of gas from the bell or gas holder.

2. In a mechanism for separating a gas from a liquid, a tank, a bell for said tank, a stand pipe centrally located within the bottom of tank and extending upwardly into said tank, a plurality of flanges carried by said stand pipe, said flanges being spaced apart and increasing in size and each lower one being of larger diameter than the one above, an overflow pipe entering the side of said tank, the end of said overflow pipe being flush with the side of said tank, a gas draw off pipe entering the bottom of said tank and extending above the level of the liquid.

Signed at the city of Los Angeles county of Los Angeles State of California, this 4th day of April 1912, in the presence of witnesses.

GEORGE L. McINTOSH.

Witnesses:
EDMUND KASOLD,
J. S. ZERBE.